Oct. 20, 1964  T. PETRIDES ETAL  3,153,784
PHOTO RADAR GROUND CONTOUR MAPPING SYSTEM
Filed Dec. 24, 1959  3 Sheets-Sheet 1

INVENTORS
Thracy Petrides
Leverett S. Tuckerman, Jr.
BY
Pennie, Edmonds, Morton, Barrows and Taylor
ATTORNEYS

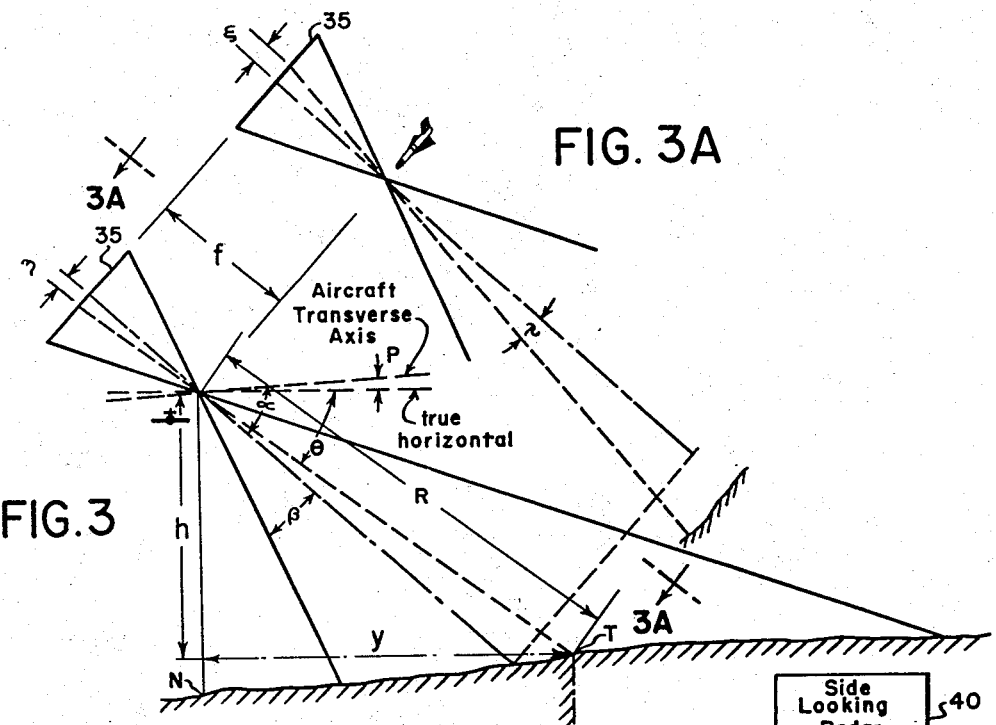
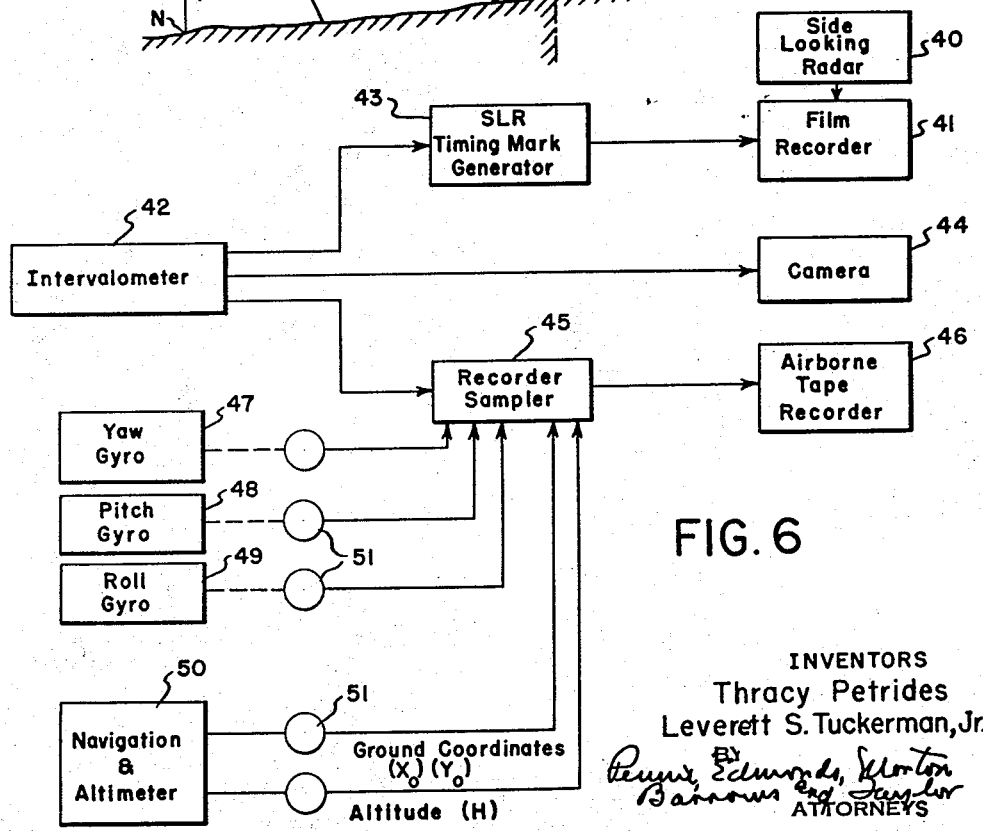

INVENTORS
Thracy Petrides
Leverett S. Tuckerman, Jr.

United States Patent Office 3,153,784
Patented Oct. 20, 1964

3,153,784
PHOTO RADAR GROUND CONTOUR
MAPPING SYSTEM
Thracy Petrides and Leverett S. Tuckerman, Jr., New York, N.Y., assignors to U. S. Industries, Inc., New York, N.Y., a corporation of Delaware
Filed Dec. 24, 1959, Ser. No. 861,816
5 Claims. (Cl. 343—5)

This invention relates to an airborne ground contour mapping system and particularly to such a system employing integrated radar and aerial camera apparatus as dual image forming sensors to provide ground elevation information, range information and planimetric mapping information for a relatively wide strip of terrain as it is flown over by the mapping aircraft.

The term "Ground Contour Mapping" as used herein includes the provision of terrain elevation data in conjunction with planimetric mapping information, whether or not the terrain elevation data so obtained is used in the delineation of contours of topographical relief.

In general, the improved airborne ground contour mapping system of the present invention employs in combination an active side-looking pulsed radar system for the procurement of high resolution orthographic terrain photographs, with an oblique side-looking aerial camera for the procurement of corresponding high resolution perspective terrain photographs. Slant-range information between the aircraft and any point of interest on the terrain is provided by the radar photograph which is a record of the pulse-echo transit time between aircraft and terrain, while the azimuth and depression angles of the same point of interest (referred to the aircraft centerline and transverse axis respectively) are provided by the perspective photograph recorded by the oblique side-looking aerial camera. Thus the integrated photo-radar system of this invention provides an accurate measurement, in polar co-ordinate form, of the slant-range and the angular direction to any point of interest located on the mapped terrain, from the aircraft. This data may be converted to cartesian co-ordinate form to provide measurements of the actual ground range between the aircraft and any point of interest on the mapped terrain, and the vertical height of the aircraft above that point. When correlated with aircraft attitude and navigational position data, complete three co-ordinate information is thereby provided for the location of any scanned point on the mapped terrain with respect to any selected co-ordinate grid and datum plane.

The integrated apparatus provided by this invention features an improved mapping accuracy over that which can be achieved by the use of known systems which employ only radar or photogrammetric systems which employ only aerial cameras. More specifically, measurement errors due to aircraft yaw are greatly reduced since the aircraft attitude data can be conveniently recorded at the instant of oblique camera exposure, once for each film frame. Measurement of relative azimuth angle from the film record of the side-looking radar data is less accurate for two reasons; first, the orthographic film image is somewhat compressed in scale reducing the accuracy of measurement which can be achieved and secondly, it is necessary to record aircraft attitude data at the end of each radar line scan and correct measurements accordingly. In the integrated system provided by the present invention, the best measuring characteristics of the two systems are advantageously combined to provide an improved airborne terrain mapping system and apparatus.

It is a principal purpose of this invention to provide an airborne ground contour mapping system employing an integrated photo-radar system having extremely high measuring and resolving capability. For a more complete understanding of the invention reference should be had to the accompanying drawings in which:

FIGS. 3 and 3A are diagrams showing the oblique camera viewing angles in elevation and oblique plan views and indicate the trigonometry involved in converting film co-ordinate measurements to depression angle and azimuth angle measurements;

Figure 5:
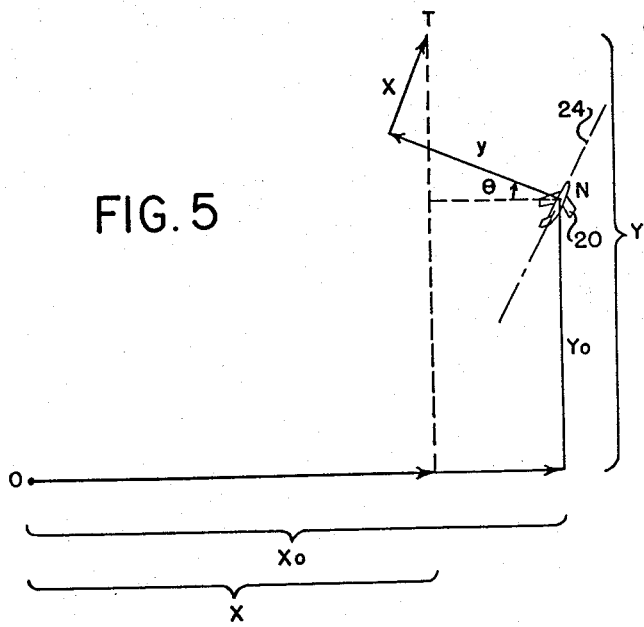

FIG. 5 is a diagram showing the trigonometry involved in converting target horizontal position co-ordinates relative to the aircraft to a set of orthogonal ground co-ordinates locating the target with respect to a known reference point; and FIG. 6 is a simplified block diagram showing the electrical circuits of an integrated photo radar ground contour mapping system in accordance with the teachings of this invention.

Figure 1:
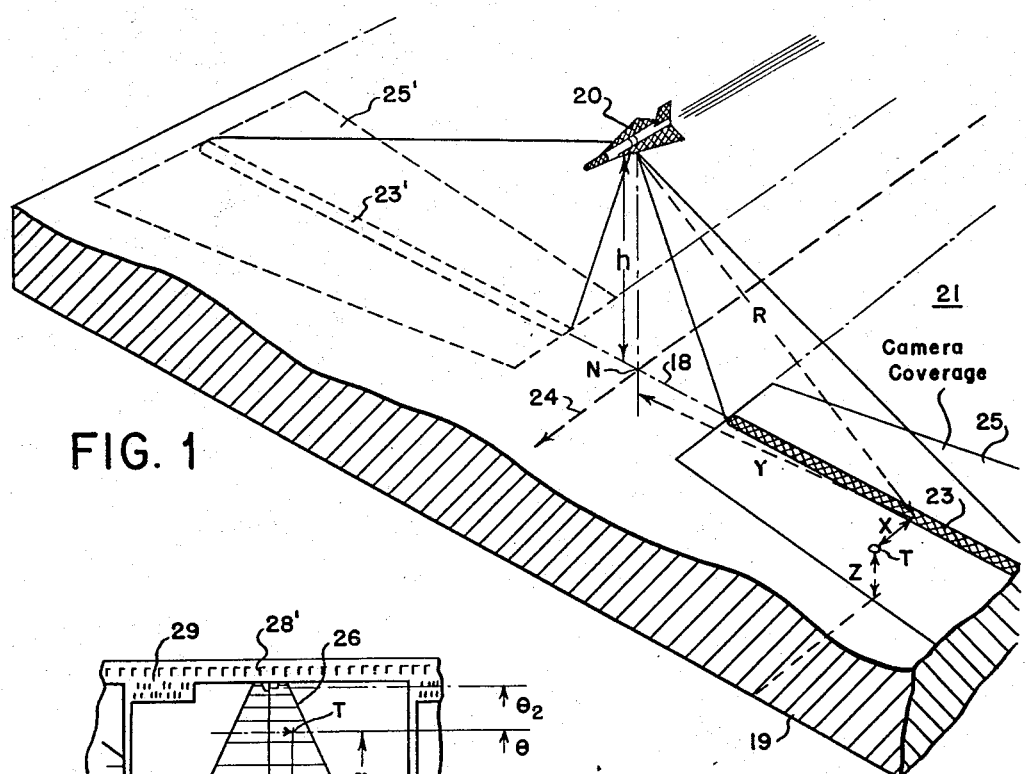
FIG. 1 is a perspective view of an aircraft carrying out a ground contour mapping operation in accordance with the invention.

Referring to FIG. 1, there is shown therein a perspective view of an aircraft 20 performing a ground mapping operation of terrain strip 21. The aircraft is adapted to measure distance $x$, $y$ and $h$ thereby locating the target point T in space with respect to the aircraft. Distance Z represents the terrain altitude above a known reference plane 19 (e.g. sea level). In accordance with the invention a mapping system carried by the aircraft is adapted to measure distance $x$ of target point T forward or aft of the transverse axis 18, lateral distance $y$ between T and the aircraft nadir point N, and the altitude $h$ of the aircraft above T. An airborne pulse-modulated side-looking radar system is employed to illuminate a narrow strip of terrain 23, with pulses of microwave energy along an axis which is transverse to the aircraft ground track 24. Side-looking radar systems are known in the art. See the article in Photogrammetric Engineering, June 1959, pages 376–380, written by Earl S. Leonardo. The radar energy which is reflected by the terrain is detected by a conventional radar receiver and displayed on an intensity modulated cathode-ray picture tube. The cathode-ray beam is deflected by a conventional sweep circuit which is triggered from the radar pulse modulator. The radar produced terrain image is recorded on a continuously moving camera film and the slant range R between aircraft and terrain is thereby measured and recorded on a time-separation basis.

An oblique camera, properly oriented at 90° to the aircraft centerline, is mounted in the aircraft to simultaneously photograph the terrain. The total area photographed by one frame exposure of the camera is shown at 25. The perspective terrain images recorded by the camera provide high definition mapping information which is used advantageously to augment the aforementioned orthographic radar map by providing a precise measure of the relative azimuth angle and the angle of depression between the aircraft and the terrain target points.

Although for purposes of simplification the mapping operation carried out by this invention will be described as single side-looking apparatus, as indicated in FIG. 1, apparatus may be provided for both sides of the aircraft where it is desired to cover a wider strip of terrain.

Figure 2A:
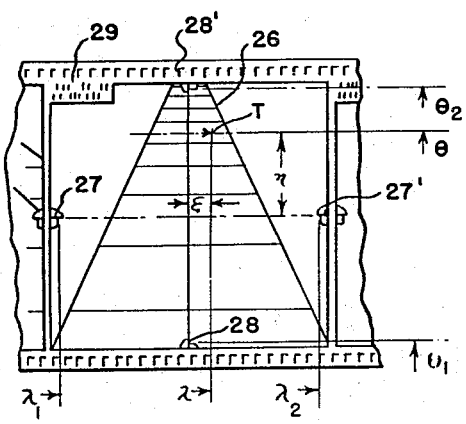
FIG. 2A is a drawing of a typical film frame photographed by an oblique side-looking aerial camera which shows the perspective terrain image recorded thereby and FIG. 2B shows the corresponding orthogonal terrain image produced by the side-looking radar system.

FIG. 2A shows a typical single film frame of a hypothetical square ground grid pattern photographed by an airborne oblique side-looking camera. It should be noted that since the camera sees the grid image 26 in perspective, image foreshortening increases proportionally with distance from the camera. Fiducial marks 28, 28' and 27, 27' are recorded along the edges of a film frame and correspond to known depression angles $\theta_1$, $\theta_2$ and known azimuth angles $\lambda_1$, $\lambda_2$ with reference to the aircraft axes. These marks, which may be recorded on each film frame by means of notched or slotted projections accurately located in the center of each side of the frame mask, conveniently serve to define a system of $\xi$, $\eta$ co-ordinates with respect to which the position of a target T on the film image may be measured. The angle of depression $\theta$ between the aircraft horizontal transverse axis and the target T is computed by measuring the distance $\eta$ between the target image and the reference fiducial marks 27, 27'. In the same manner azimuth angle $\lambda$ between the aircraft and the target T is computed by measuring the distance $\xi$ between the target image and the reference fiducial marks 28, 28'. The actual trigonometric computations involved in computing the respective depression and azimuth angles will be explained more fully in conjunction with the descriptions of FIGS. 3 and 3A.

The film frame photographed by the oblique camera is advantageously identified with a coded frame number 29 to expedite correlation of the camera film frames with the corresponding radar film images. A light-weight aerial mapping camera (e.g. 70 mm.) may be mounted looking out the side of the aircraft so that it will photograph substantially the same area as that covered by the side-looking radar. The camera, having a lens of desired focal-length $f$, and hence a known angle of view, may be boresighted precisely with respect to the aircraft axis and then mounted securely to the airframe. Thereafter, the fiducial marks on the film frame are relied upon for measuring the angle of depression $\theta$ between the aircraft and the target point of interest and the azimuth angle $\lambda$ between the aircraft and the target point of interest.

Figure 2B:
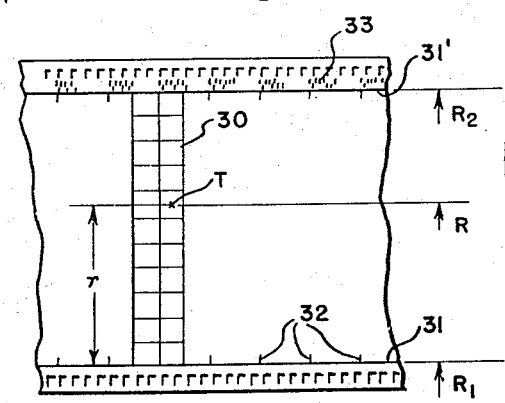

FIG. 2B shows the corresponding orthographic image of the same hypothetical ground grid pattern which is produced by the side-looking radar and recorded on a continuously moving photographic film. Assuming that the square grid pattern is disposed on flat terrain, it will be noted that the image 30 produced by the side-looking radar (as shown) has no perspective effect as in the case of the corresponding oblique camera image shown in FIG. 2A. Instead, ground distances are reproduced to the same constant scale parallel and perpendicular to the ground track. Where linear sweeps are employed in the radar recorder tube the lateral distance $r$ to target T on the film image represents a direct measure of the actual slant-range R between the aircraft and the target.

Slant range R is computed by interpolating the lateral image distance $r$ between pre-calibrated range markers 31, 31' (corresponding to known ranges $R_1$, $R_2$ as shown) which may comprise precision range marker pulses superimposed on the radar video signal supplied to the recorder cathode-ray tube. In addition to these sweep range calibration marks, timing marks 32 are also advantageously recorded on the radar film presentation. These marks are recorded on the radar strip film each time the oblique side-looking camera is exposed and may consist of timing pulses superimposed on the radar video signals. Coded frame numbers 33 may be advantageously recorded adjacent to each timing mark to provide a simple means for correlating the radar image with the corresponding coded camera frame number 29 shown in FIG. 2A.

The trigonometry involved in converting the slant-range and the angular measurements, made from the side-looking radar photographs and the oblique side-looking camera photographs respectively, to cartesian co-ordinates is shown graphically in FIGS. 3 and 3A. In the vertical elevation diagram (FIG. 3) distance $\eta$ on the film plane 35 of the oblique camera (shown exaggerated in scale) is the lateral film image co-ordinate between the target point and a central fiducial mark as shown in FIG. 2A; $f$ represents the focal length of the aerial camera lens; $\rho$ represents the instantaneous roll-angle of the mapping aircraft and $\alpha$ represents the camera tilt angle measured between the aircraft horizontal transverse axis and the optical axis of the lens. The angle $\beta$ represents half of the view angle of the camera measured between the fiducial marks on the film frame (e.g. 27, 28 in FIG. 2A).

The target depression angle $\theta$ measured with respect to the true horizontal axis of the aircraft is computed from the following equation:

$$\theta = \alpha - \rho - \tan^{-1}\left(\frac{\eta}{f}\right) \quad (1)$$

Slant-range R between the aircraft centerline axis and a target area T is measured on a time separation basis as described above by the side-looking radar system. True ground range $y$ between the aircraft and the target T is calculated by multiplying R by cosine $\theta$ while the height $h$ of the aircraft with respect to T is obtained by multiplying R by sine $\theta$.

In the oblique plan view diagram shown in FIG. 3A, distance $\xi$ on the film plane 35 (rotated 90° with respect to FIG. 3) is the longitudinal co-ordinate (parallel to aircraft ground track) between the target point and a central fiducial mark as shown in FIG. 2A. This film image co-ordinate is used to directly compute the azimuth angle $\lambda$ between the aircraft transverse axis and the target T. The azimuth angle $\lambda$ at the instant of oblique camera exposure is given by the expression:

$$\lambda = \tan^{-1}\left(\frac{\xi}{f}\right) \quad (2)$$

Assuming the aircraft pitch angle $\psi$ to be zero, the longitudinal ground component $x$ can be computed by multiplying R by tan $\lambda$.

Figure 4:
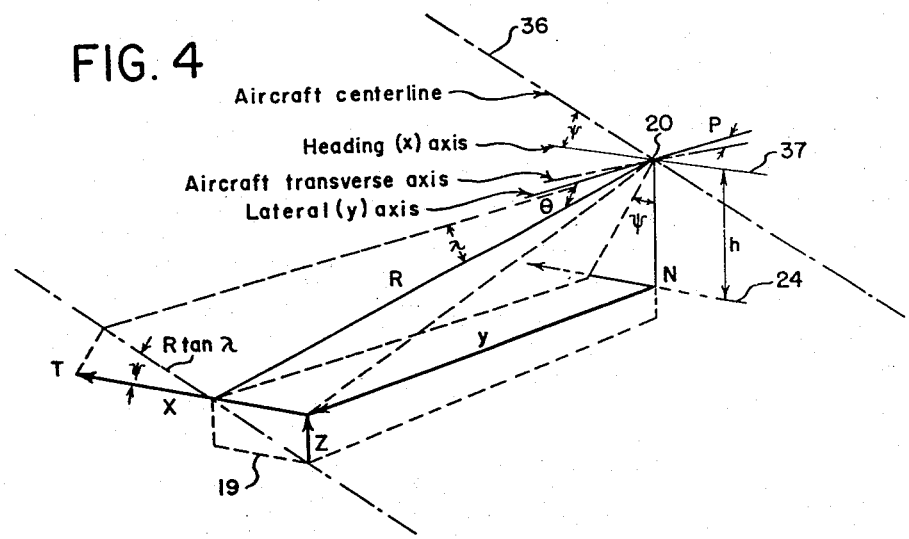
FIG. 4 is a three dimensional diagram indicating the trigonometry involved in obtaining ground range measurements between a target point of interest and the mapping aircraft, including compensations for various changes in attitude of the aircraft.

The three dimensional perspective diagram of FIG. 4 indicates the trigonometric compensation required in the computation of ground range component $x$ due to the introduction of vertical pitch angle $\psi$ between the aircraft centerline 36 and the horizontal aircraft heading axis 37 as shown. Change in the aircraft pitch angle causes the radar beam and the oblique camera to be rotated through an angle $\psi$. The $x$ ground range component compensated for pitch angle is given by the following equation:

$$x = \frac{R}{\cos \psi} \tan \lambda + R \sin \theta \sin \psi \quad (3)$$

The $y$ ground range component is computed as indicated above, no compensation being required for change in aircraft pitch angle. Distance Z in the diagram represents the height of the target with respect to a given horizontal reference plane 19 and is simply calculated by subtracting $h$ from the absolute reference altitude H measured by a conventional altimeter.

The diagram of FIG. 5 is provided to explain the trigonometric steps involved in rotating the relative ground co-ordinates $x$ and $y$ (aircraft to target) through the aircraft heating angle $\phi$ (measured with respect to the east-west X co-ordinate as shown) in order to locate the target T with respect to point O. Aircraft 20, flying in the direction of ground track 24 above nadir point N, is located by horizontal grid co-ordinates $X_0$, $Y_0$ with respect to reference point O. Target T is located by ground co-ordinates $x$ and $y$ with respect to the mapping aircraft as described above. Target T may then be located with respect to point O at co-ordinate distances X and Y by solving the following equations:

$$X = X_0 + x \sin \phi - y \cos \phi \quad (4)$$

$$Y = Y_0 + x \cos \phi + y \sin \phi \quad (5)$$

A simplified block diagram of an integrated photo-radar ground contour mapping system is shown in FIG.

6. The system is adapted, in accordance with the teachings of this invention, to gather the necessary mapping information for locating any target point on the mapped terrain (in three co-ordinates) with respect to any given reference point. The video signal from the conventional side-looking radar system 40 is supplied to the cathode-ray tube film recorder 41 wherein an orthographic terrain image is recorded on a continuously moving strip of photographic film. A synchronizing pulse generator or intervalometer 42 is provided to synchronize the recording of all mapping information. Thus electrical timing pulses are supplied to timing mark generator 43 which produces the timing pulses for the radar film recorder as shown in FIG. 2B. The intervalometer also supplies electrical driving pulses to the film pull-down drive mechanism for the side-looking camera 44. These pulses control the timing of the camera film frame advance and exposure thereby synchronizing the camera exposure with the aforementioned timing pulses which are recorded on the radar film recorder. A binary film frame counter may be advantageously employed on the side-looking camera to provide code signals for numbering each camera film frame as well as for identifying a corresponding portion of the radar film. The binary signals may be displayed on conventional neon tube read-out units and photographed with separate optical systems along the respective edges of the camera film frame and radar film strip as shown in FIGS. 2A and 2B.

Sampling or gating pulses are supplied by the intervalometer to the recorder sampler 45 which is a multiple channel gating circuit that is gated on and off by gating pulses from intervalometer 42. Gating circuits suitable for use as a recorder sampler are described in Chapter 13 of Pulse and Digital Circuits by Millman and Taub published by McGraw-Hill Book Co. in 1956. A multiple channel tape recorder 46 is provided to record simultaneously the aircraft attitude data supplied by yaw gyro 47, pitch gyro 48 and roll gyro 49 via sampler 45. The attitude data may alternatively be recorded in binary form on the edges of the film in the same way as the frame number, as indicated in FIG. 2A, as part of code group 29. The aircraft attitude information is advantageously produced by individual binary shaft coders 51 associated with each gyro.

Navigational position data is supplied by apparatus shown at 50 which may take the form of a Doppler or inertial navigator and altimeter supplying aircraft position and absolute altitude information in coded form to the recorder sampler. Thus, each time a frame of film is exposed in the oblique side-looking camera, the aforementioned aircraft navigational data is simultaneously sampled and recorded on the multiple channel tape recorder as shown.

The system provided by this invention, as indicated in FIG. 6 effectively provides a high resolution film record of the terrain being mapped from which target depression angle and target azimuth angle may be precisely measured, a correlated high resolution orthographic radar produced terrain map recorded on film from which slant-range between aircraft and target may be accurately measured, and finally a correlated record of aircraft navigational position and attitude data is provided thereby making it possible to correct for aircraft attitude errors and at the same time extend the correlated aircraft measurements to a remote reference point or command base.

It will be apparent to those skilled in the art that the ways in which the terrain data developed by the invention may be processed and utilized, either with airborne or ground-based equipment, will be limited only by the ingenuity of the user.

While a preferred embodiment of the invention has been shown and described herein, various modifications within the scope of the appended claims will be apparent to those skilled in the art.

We claim:
1. An integrated photo-radar ground contour mapping system adapted to be operated while airborne to produce simultaneously a plurality of recorded correlated signals and photographic images for ultimate display and utilization, the combination comprising an active side-looking radar system adapted to radiate a narrow horizontal beam of pulsed energy from the aircraft towards the earth's surface in a substantially vertical plane transverse the ground track of said aircraft and adapted to provide signals containing terrain slant-range information with respect to said aircraft, an electro-optical transducer for displaying said signals, a camera adapted to photographically record said displayed signals, a side-looking camera adapted to photograph at a predetermined angle views of said terrain and to provide terrain depression-angle information and relative azimuth information with respect to said aircraft, means for producing a signal corresponding substantially to the absolute altitude of said aircraft with respect to a predetermined reference plane, intervalometer means to synchronously control the respective drives for said side-looking camera and said camera for recording the displayed side-looking radar signals, and means for recording said altitude signal concomitantly with each film frame exposure on said side-looking camera, whereby ground elevation and range information as well as planimetric mapping information is provided for a wide strip of terrain passed over by the mapping aircraft.

2. An integrated photo-radar ground contour mapping system adapted to be operated while airborne to produce simultaneously a plurality of recorded correlated signals and photographic images for ultimate display and utilization, the combination comprising an active side-looking radar system adapted to radiate a narrow horizontal beam of pulsed energy from the aircraft towards the earth's surface in a substantially vertical plane transverse the ground track of said aircraft and adapted to provide signals containing terrain slant-range information with respect to said aircraft, an electro-optical transducer for displaying said signals, a camera adapted to photographically record said displayed signals, a side-looking camera adapted to photograph at a predetermined angle views of said terrain and to provide terrain depression-angle information and relative azimuth information with respect to said aircraft, means for producing a signal corresponding substantially to the absolute altitude of said aircraft with respect to a predetermined reference plane, means for producing a signal corresponding to the roll-angle of said aircraft, intervalometer means to synchronously control the respective drives for said side-looking camera and said camera for recording the displayed side-looking radar signals and means for recording said altitude signal and said roll-angle signal concomitantly with each film frame exposure on said side-looking camera, whereby ground elevation and range information as well as planimetric mapping information is provided for a wide strip of terrain passed over by the mapping aircraft.

3. An integrated photo-radar ground contour mapping system adapted to be operated while airborne to produce simultaneously a plurality of recorded correlated signals and potographic images for ultimate display and utilization, the combination comprising an active side-looking radar system adapted to radiate a narrow horizontal beam of pulsed energy from the aircraft towards the earth's surface in a substantially vertical plane transverse the ground track of said aircraft and adapted to provide signals containing terrain slant-range information with respect to said aircraft, an electro-optical transducer for displaying said signals, a camera adapted to photographically record said displayed signals, a side-looking camera adapted to photograph at a predetermined angle views of said terrain and to provide terrain depression-angle information and relative azimuth information with respect to said aircraft, means for producing a signal corresponding substantially to the absolute altitude of said aircraft with respect to a predetermined reference plane, means for producing a signal corresponding to the roll-angle of said aircraft, means for producing a signal corresponding to the pitch-angle of said aircraft, intervalometer means to synchronously control the respective drives of said side-looking camera and said camera for recording the displayed side-looking radar signals and means for recording said altitude signals, said roll-angle signal and said pitch-angle signal concomitantly with each film frame exposure on said side-looking camera, whereby ground elevation and range information as well as planimetric mapping information is provided for a wide strip of terrain passed over by the mapping aircraft.

4. An integrated photo-radar ground contour mapping system adapted to be operated while airborne to produce simultaneously a plurality of recorded correlated signals and photographic images for ultimate display and utilization, the combination comprising an active side-looking radar system adapted to radiate a narrow horizontal beam of pulsed energy from the aircraft towards the earth's surface in a substantially vertical plane transverse the ground track of said aircraft and adapted to provide signals containing terrain slant-range information with respect to said aircraft, an electro-optical transducer for displaying said signals, a camera adapted to photographically record said displayed signals, a side-looking camera adapted to photograph at a predetermined angle views of said terrain and to provide terrain depression-angle information and relative azimuth information with respect to said aircraft, means for producing a signal corresponding substantially to the absolute altitude of said aircraft with respect to a predetermined reference plane, means for producing a signal corresponding to the roll-angle of said air-craft, means for producing a signal corresponding to the pitch-angle of said aircraft, means for producing a signal corresponding to the yaw angle of said aircraft, intervalometer means to synchronously control the respective drives of said side-looking camera and said camera for recording the displayed side-looking radar signals, and means for recording said altitude signal, said roll-angle signal, said pitch-angle signal and said yaw-angle signal concomitantly with each film frame exposure on said side-looking camera, whereby ground elevation and range information as well as planimetric mapping information is provided for a wide strip of terrain passed over by the mapping aircraft.

5. An integrated photo-radar ground contour mapping system adapted to be operated while airborne to produce simultaneously a plurality of recorded correlated signals and photographic images for ultimate display and utilization, the combination comprising an active side-looking radar system adapted to radiate a narrow horizontal beam of pulsed energy from the aircraft towards the earth's surface in a substantially vertical plane transverse the ground track of said aircraft and adapted to provide signals containing terrain slant-range information with respect to said aircraft, an electro-optical transducer for displaying said signals, a camera adapted to photographically record said displayed signals, a side-looking camera adapted to photograph at a predetermined angle views of said terrain and to provide terrain depression-angle information and relative azimuth information with respect to said aircraft, means for producing a signal corresponding substantially to the absolute altitude of said aircraft with respect to a predetermined reference plane, means for producing a signal corresponding to the roll-angle of said aircraft, means for producing a signal corresponding to the pitch-angle of said aircraft, means for producing a signal corresponding to the yaw angle of said aircraft, means for producing a signal corresponding to the bearing angle of said aircraft with respect to a known reference point, means for producing a signal corresponding to the range of said aircraft with respect to a known reference point, intervalometer means to synchronously control the respective drives of said side-looking camera and said camera for recording the displayed side-looking radar signals, and means for recording said altitude signal, said roll-angle signal, said pitch-angle signal, said yaw-angle signal, said bearing angle signal and said range signal concomitantly with each film frame exposure on said side-looking camera, whereby ground elevation and range information as well as planimetric mapping information is provided for a wide strip of terrain passed over by the mapping aircraft.

References Cited in the file of this patent
UNITED STATES PATENTS

| | | |
|---|---|---|
| 2,705,319 | Dauber | Mar. 29, 1955 |
| 2,753,552 | Hom | July 3, 1956 |
| 2,839,974 | Reiner et al. | June 24, 1958 |
| 3,039,091 | Gillette | June 12, 1962 |